US006862625B1

(12) United States Patent
Busey et al.

(10) Patent No.: US 6,862,625 B1
(45) Date of Patent: Mar. 1, 2005

(54) METHOD AND APPARATUS FOR REAL TIME NETWORK COMMUNICATION

(75) Inventors: Andrew T. Busey, Austin, TX (US); Gerald H. Weghorst, Jr., Austin, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/060,867

(22) Filed: Apr. 15, 1998

Related U.S. Application Data

(63) Continuation of application No. 08/722,898, filed on Sep. 27, 1996, now Pat. No. 5,764,916.

(51) Int. Cl.[7] .............................................. G06F 15/16
(52) U.S. Cl. ........................ 709/227; 709/203; 709/204
(58) Field of Search ................................ 709/203, 204, 709/206, 227, 232, 237, 238, 248; 380/25

(56) References Cited

U.S. PATENT DOCUMENTS

| 4,837,798 | A | | 6/1989 | Cohen et al. |
| 5,159,669 | A | | 10/1992 | Trigg et al. ................. 345/814 |
| 5,220,657 | A | | 6/1993 | Bly et al. .................... 709/201 |
| 5,550,906 | A | | 8/1996 | Chau et al. |
| 5,659,729 | A | | 8/1997 | Nielsen ......................... 707/3 |
| 5,668,863 | A | | 9/1997 | Bieselin et al. |
| 5,671,428 | A | | 9/1997 | Muranaga et al. .......... 345/751 |
| 5,790,793 | A | * | 8/1998 | Higley ....................... 709/206 |
| 5,793,966 | A | * | 8/1998 | Amstein et al. ............. 709/203 |
| 5,796,393 | A | | 8/1998 | MacNaughton et al. .... 345/733 |
| 5,799,151 | A | * | 8/1998 | Hoffer ........................ 709/204 |
| 5,828,839 | A | | 10/1998 | Moncreiff ................... 709/204 |
| 5,862,223 | A | * | 1/1999 | Walker et al. ................ 380/25 |
| 5,862,330 | A | | 1/1999 | Anupam et al. ............ 709/204 |
| 5,884,032 | A | | 3/1999 | Bateman et al. |
| 5,907,547 | A | | 5/1999 | Foladare et al. |
| 5,987,401 | A | * | 11/1999 | Trudeau ......................... 704/2 |
| 5,987,503 | A | * | 11/1999 | Murakami ................... 709/204 |
| 6,031,836 | A | | 2/2000 | Haserodt |
| 6,385,191 | B1 | | 5/2002 | Coffman et al. |

FOREIGN PATENT DOCUMENTS

| EP | 0 581 722 A1 | * | 2/1994 |
| EP | 0 581 722 A1 | * | 2/1994 |

OTHER PUBLICATIONS

Waite et al., The Waite Group's UNIX Primer Plus, SAMS, 1990, p. 61.*
Kapor et al., Big Dummy's Guide to the Internet: Chapter 11: IRCs, MUDs, . . . , v 2.2,, Electronic Frontier Foundation, 1994, 11 pages.*
Author unknown, Computer Club West—How to BBS, Sep. 1993, Pasco BBS Magazine, 10 pages.*
Delgrossi et al., RFC 1819: Internet Stream Protocol Specification—Version ST2+, Network Working Group, Aug. 1995.*
Author unknown, WebBoard builds powerful on–line forums effortlessly, InfoWorld, May 13, 1996, 2 pages.*
Author unknown, Eudora Pro 3.0: Outstanding E–mail reader gets even better, MacUser, Aug. 1996, 2 pages.*
Chris Reyes, IRC and AOL(America Online—Internet Relay Chat), http://members.aol.com/, Dec. 10, 1996, 5 pages.*
mIRC, v.3.7. "Versions txt" (Dec. 10, 1995), pp. 1–16, retrieved from www.mirc.org.

(List continued on next page.)

*Primary Examiner*—Patrice Winder
(74) *Attorney, Agent, or Firm*—Blakely, Sokoloff, Taylor & Zafman LLP

(57) ABSTRACT

A real time communications protocol connection is formed over a network communications connection. A markup language instruction is embedded in a message. The message is sent on the real time communications protocol connection.

51 Claims, 3 Drawing Sheets

OTHER PUBLICATIONS

Donath, J., et al., The Socialable Web, MIT media lab, Internet: htt;://Judith.www.media.mit.edu/SocialWeb/SociableWeb.html.

Frentzen, J., "Real–time Internet conferencing Takes Off," PCWEEK, Feb. 20, 1995, v12, No. 7, p. 18, (Computer Select CD, Dec. 1995).

Constance, P., "Interlink posts intelligence data on the Web for 100,000 curious surfers," Government Computer News, May 27, 1996, v15, No. 11, p. 60. (Computer Select CD, Dec. 1996).

"Choose your topology", Release 1.0, Jun. 23, 1995, v95, No. 6, p. 15, (Computer Select CD, Dec. 1995).

"Look who's talking", Computer Letter, Jul. 29, 1996, vol. 12, No. 25, p. 1 (computer Select CD, Dec. 1996).

Blair, D., "MaxWeb 2.0: Interactive 3D Cinema on the World Wide Web", USENET posting Apr. 3, 1995, Internet–www.google.com/groups.

* cited by examiner

METHOD AND APPARATUS FOR REAL TIME NETWORK COMMUNICATION

CROSS-REFERENCE TO RELATED APPLICATION

This patent application is a continuation of co-assigned U.S. patent application Ser. No. 08/722,898, filed Sep. 27, 1996, now U.S. Pat. No. 5,764,916, which is hereby fully incorporated herein by this reference thereto.

BACKGROUND

1. Technical Field

This patent application relates in general to network communication, and in particular to real-time network communication.

2. Description of Related Art

The location and exchange of data over computer networks is controlled by various network protocol. For example, the World Wide Web (hereinafter "Web") is a system of communications protocols that presents information in documents that are capable of being linked to other documents. The documents are stored in a distributed manner across the Internet on the networked computers, and are accessed using programs known as browsers.

The Web is a system of protocols exchanged between a host computer running an application, known as a server, that delivers Web documents, and a user's computer, known as the client. The most fundamental of Internet protocols is Transmission Control Protocol/Internet Protocol, or TCP/IP, which in effect provides a description of the document data being exchanged and a destination for that data.

Web documents are created using a markup language known as html, or Hypertext Markup Language. Generally, a markup language is a set of instructions, or markups that is used to direct a browser how to display and manage a document. Specifically, html defines the format of a Web document and enables hyperlinks to be embedded in the Web document. Hyperlinks are used to connect a document on one host computer to a document on another host computer. The following html paragraph is illustrative.

<P>

Welcome to the home page of <B>ichat, Inc. </B>. We develop <A

HREF=". . . /products/index.html">software</A>that expands the functionality and accessibility of real-time Internet chat systems.

The html tags "<B> . . . </B>" instructs the browser to display ichat Inc. in bold font. The html tag "<A HREF=" instructs the browser to create a link to a web page referenced by the embedded Uniform Resource Locator ("URL"), which is a type of address, and to use the word "software" embedded between the tags ">. . . <A>" as the hyperlinked word. The link may be a target, which is a word or phrase in another section of the same Web page; a relative link, which is another Web page within the current site, either forward or backward relative to the current page; or an external or absolute link, which is a Web page on another host.

A Web browser or client requests a Web document in accordance with its URL, which typically is furnished either manually by the user, through a Web browser bookmark, or through a hyperlink embedded in an html document. The Web browser causes a two-way TCP/IP connection to be established between the client and the host from which the desired Web document is available, and then generates and sends to the host a request header to establish an HTTP connection. The server on the host responds to the URL either by (i) following the directory path contained in the URL and opening the file containing the requested document; or (ii) running a CGI, or Common Gateway Interface, script; or (iii) detecting an error and generating an error document. The host then returns the document along with its file type to the client. After the client acknowledges receipt of the Web document, the host closes the HTTP connection even though the TCP/IP connection may be maintained by the service provider.

The term "HTTP" used above stands for Hypertext Transfer Protocol, which is a transfer protocol that sits on top TCP/IP and is a stateless protocol designed to transfer documents at a high rate of speed. As a stateless system, HTTP does not retain any information from one document transfer to the next. If additional documents are needed, each additional document must be transferred by opening a new HTTP connection, requesting the document, delivering the document, and closing the connection.

After the requested Web document is received and the HTTP connection closed, the browser interprets the page format from the imbedded html tags in a process known as parsing. Typically, the html tags format text, load images, and embeds hyperlinks. When the browser encounters an html tag that links to a different type of MIME file such as a sound clip or picture, the browser separately requests that sound clip or picture in another HTTP connection. Hence, if the Web page contains both a sound clip and an image, three requests are made—one for the original html page, one for the sound clip file, and one for the image file.

Although generally successful for many Web functions, the HTTP protocol is ineffective for enabling real-time functions such as chat over networks such as the Internet. However, chat is available over the Internet using the Internet Relay Chat protocol, or IRC. IRC uses the TCP/IP protocol in a client/server model. IRC client software is installed on the user side and integrated into the Web browser. One client initiates a channel by connecting to an IRC enabled server, which may or may not be on the same host as the Web server. Other clients join the channel by typing a join IRC command. The IRC server mediates the channel, passing each message to all channel members or to particular channel members, as determined by the originator of the message.

While IRC has had some success, its widespread use is hampered by several inconvenient aspects of the protocol. For example, IRC is cumbersome and does not support features common in Web browsers, such as hyperlinks and graphics.

SUMMARY

A real time communications protocol connection is formed over a network communications connection. A markup language instruction is embedded in a message. The message is sent on the real time communications protocol connection.

It is a technical advantage that real-time communication is maintainable over computer networks such as the Internet with enhanced functionality of the type generally available to World Wide Web users using Web browsers.

BRIEF DESCRIPTION OF THE DRAWINGS

In the drawings, in which like reference characters indicate like parts.

DETAILED DESCRIPTION

Figure 1:
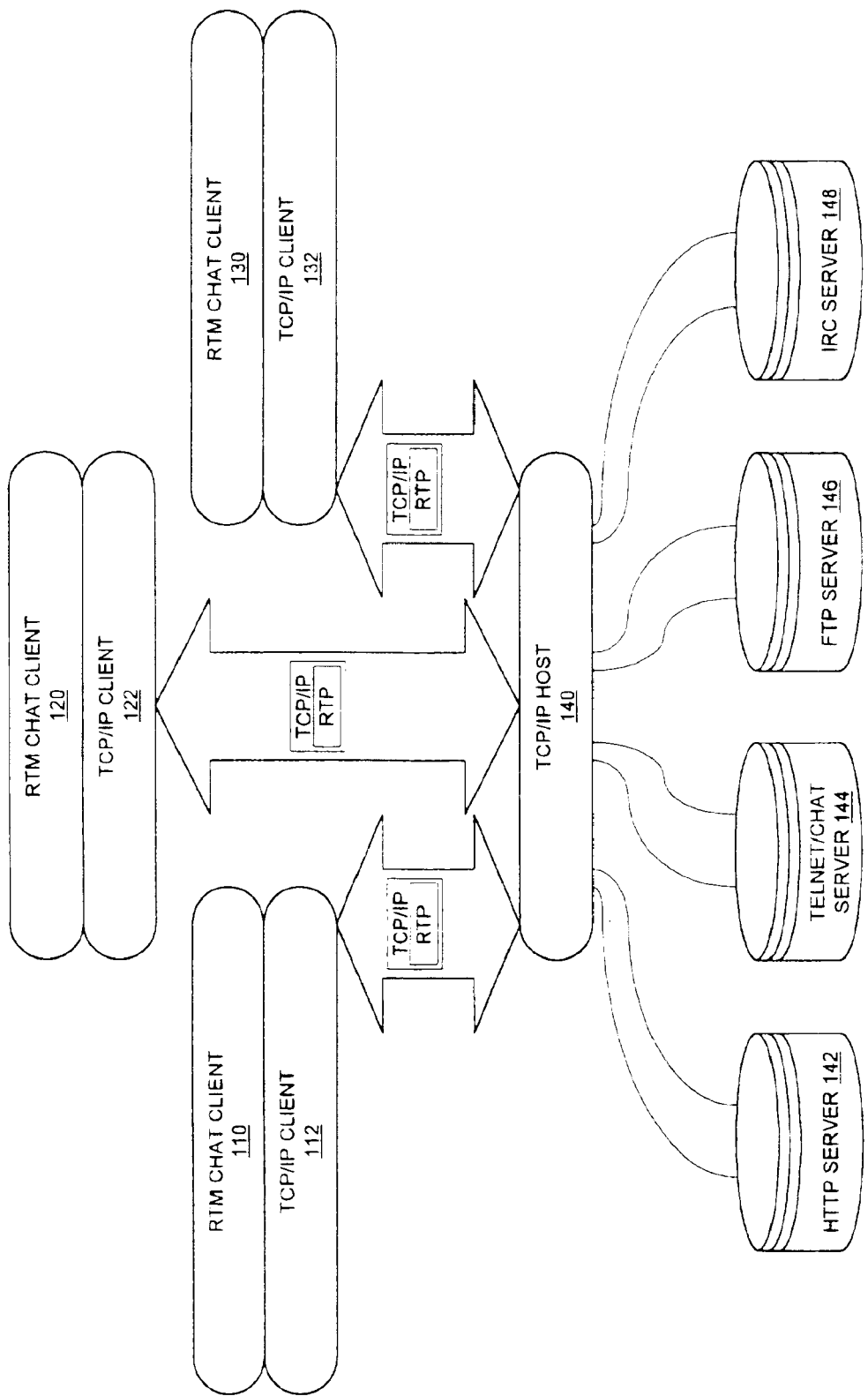
FIG. 1 is a schematic diagram of network protocol connections between clients and a host.
Figure 2:
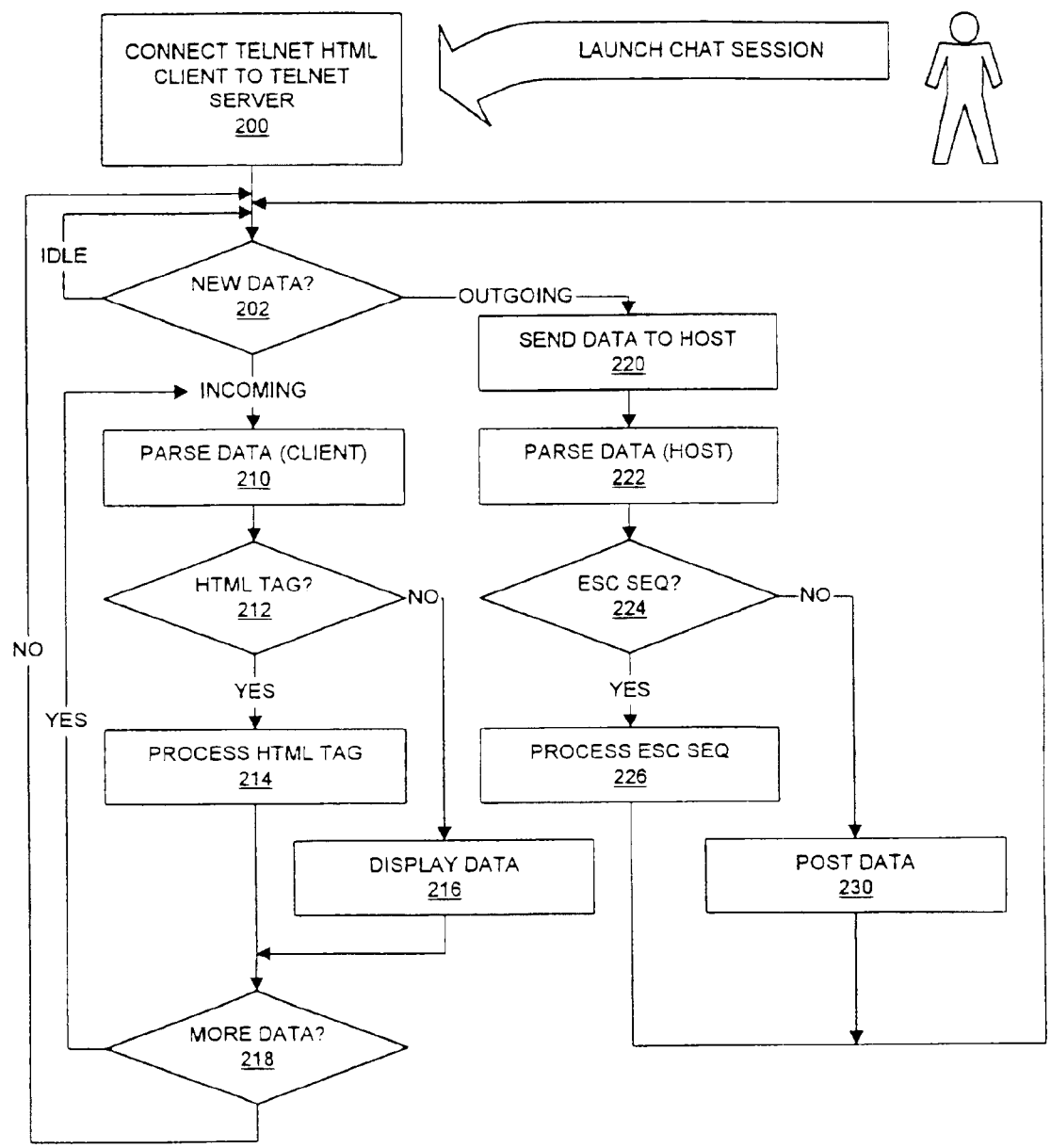
FIG. 2 is a flow chart of a method for real time network chat.

FIG. 1 and FIG. 2 show a process for real-time conferencing across the Internet. The process begins with a user who launches a chat session from his or her computer, preferably from a browser application running on the computer, by running an application called a real time markup ("RTM") chat client. The computer operating system ("OS") causes a two-way TCP/IP connection to be established between the client computer and a host computer for the chat session, while the RTM chat client causes a real time full duplex connection to be established between the RTM chat client and a real time server on the host. Other users join the chat session by establishing TCP/IP connections and launching their own RTM chat clients. FIG. 1 shows three RTM chat clients 110, 120 and 130, which run on top of respective TCP/IP clients 112, 122 and 132. The TCP/IP connections are established with a host computer, which runs TCP/IP host software 140 and typically hosts several different types of servers. FIG. 1 illustratively shows four servers, an HTTP server 142, a telnet/chat server 144, an FTP server 146, and an Internet Relay Chat ("IRC") server 148. Typically, a variety of other server types reside on the host computer as well, including, for example, Gopher, Usenet and WAIS.

A real time chat client is any client capable of sustaining what appears to a user to be real time chat. The effect of real time is created by using a continuously open connection protocol such as, for example, a continuously open streaming protocol such as telnet or a continuously open connection packet protocol such as IRC. Telnet is a well known streaming protocol used to establish bi-directional continuously opened sockets and full duplex data transmission to achieve real time communications. The telnet protocol is an industry standard. UNIX hosts are generally provided with telnet servers as part of their operating systems. Other examples of continuously opened connection streaming protocols include UDP, or Universal Data Protocol, and a variety of proprietary protocols. IRC is a well-known packet protocol used to establish bi-directional continuously opened sockets and full duplex data transmission to achieve real time communications. The IRC protocol is an industry standard, fully defined in RFC 1459. In contrast, the HTTP protocol defines a transactional half-duplex data transmission. HTTP connections are opened and closed as documents are requested and sent. Real time communication is not realized.

A markup language is any language that enables document formats to be defined, and may also enable hyperlinks to be embedded in documents. The most popular markup language in use on the Web is html, which supports embedded hyperlinks, various font styles such as bold and italics, and various MIME (Multipurpose Internet Mail Extension) file types for text and embedded graphics, video and audio.

FIG. 2 shows what happens when a RTM chat client is launched. Illustratively, the chat client in FIG. 2 is a telnet html chat client and the host includes a telnet server and a server-side application known as a chat server that enables communication between two or more chat clients. While FIG. 2 shows use of the telnet protocol and a compatible chat server, the IRC protocol and an IRC chat server may be used if desired, as well as any other continuously open bi-directional connection chat client-server types and compatible chat server applications. Chat servers are well known; for example, the telnet protocol and proprietary chat server software is commonly used by commercial BBS services, and the IRC protocol and IRC server side chat applications are common in many UNIX environments. While FIG. 2 also shows use of html, other markup languages may be used if desired.

After the TCP/IP and telnet connections are made (step 200), the telnet html chat client immediately begins to receive any messages being posted by the chat server, and may send messages to other telnet html chat clients through the chat server or remain idle in the event that no messages are being sent or received. While non-html telnet clients may also be connected to the chat server, they will not be capable of displaying the incoming data with fidelity because they will not be able to properly parse it.

Messages outgoing from the telnet chat client are processed as follows. The telnet chat client is designed either to send each keystroke to the host either individually or in groups. In either case, the telnet chat client appends the keystroke(s) to a TCP/IP header and the resulting packet is sent to the chat host (step 220). The chat host parses the incoming data in real time (step 222). If the chat host detects a telnet escape sequence (step 224), it processes the detected escape sequence (step 226). Otherwise, the chat host simply posts the data (step 230) to all connected telnet clients or to a specific or ones of connected telnet clients if so instructed by the chat server. The telnet host does not recognize or process html tags in the data, and simply posts them. Connected telnet clients that are not html enabled simply display the html tags as they are received. However, connected telnet html clients recognize and respond to the html tags in the data.

Messages outgoing from an IRC chat client are processed in a slightly different manner. An IRC packet is the entire series of keystrokes preceding a carriage return. An IRC chat client appends the IRC packet or in some cases breaks up the IRC packet into sub-packets and appends each sub-packet to a TCP/IP header, and the resulting TCP/IP packet is sent to the IRC chat host. The IRC chat host parses the incoming data in real time, processing any IRC headers and handling the appended data accordingly.

The telnet chat client processes incoming messages containing html tags as follows. The telnet chat client parses the incoming data (step 210) to distinguish between html tags and characters to be displayed. If an html tag is detected (step 212), the tag is processed as appropriate (step 214). If an html tag is not detected (step 212), the incoming data is displayed on the chat screen of the telnet chat client computer (step 216). In either case, the telnet chat client then looks for more data to process (step 218), and either resumes parsing or idles if no incoming or outgoing message is present.

The telnet connection is terminated either by the client or the host. Termination is done by releasing the socket for the connection, in a manner well known in the art.

An example of a real time chat session among chat clients using html is as follows.

<Sarah>Hi everyone! I found a great web site. Check out the ichat site.

<Sam>Thanks for the info, Sara. I'm going to check out the site now. Bye.

This text appears on the screens of the html chat clients who are members of the chat session.

When Sarah types her message, she uses either macros or html itself to cause the word "great" to appear in an italics font style, the phrase "Check out" to appear in a bold font style, and to create the hyperlink ichat site. Sarah's chat client software sends the following illustrative data stream to members of the chat session via the host.

Hi everyone! I found a <I>great</I>web site. <B>Check out</B>the <A HREF="http://www.ichat.com">ichat site.<A>

The html chat client software displays Sara's message as it is typed in a normal font, until the "<I>" tag is detected. The characters "great" are displayed as they are typed in an italics style font until the "/I>" tag is detected, after which subsequent characters are again displayed at they are typed in a normal font. When the "<B>" tag is detected, the subsequent characters "great" are displayed as they are typed in a bold font until the "</B>" tag is detected, after which subsequent characters are again displayed as they are typed in a normal font. When the tag "<A HREF="http://www.ichat.com">" is detected, Sam's software responds by linking the URL "http://www.ichat.com" to the text following the tag, until the tag "<A>" is detected. Hence, the URL "http://www.ichat.com" is linked to the hyperlink ichat site. This hyperlink is displayed as its characters are typed in a underlined and colored font until the "</A>" tag is detected, after which any subsequent characters are displayed at they are typed in a normal font.

Sam responds to Sara's message with his message, and then simply clicks on the hyperlink "ichat site" in his chat window using either his mouse or keyboard navigation. This action launches Sam's Web browser, if it is not already running. Sam's Web browser takes him to the ichat home page, without need for Sam to enter a URL.

Figure 3:
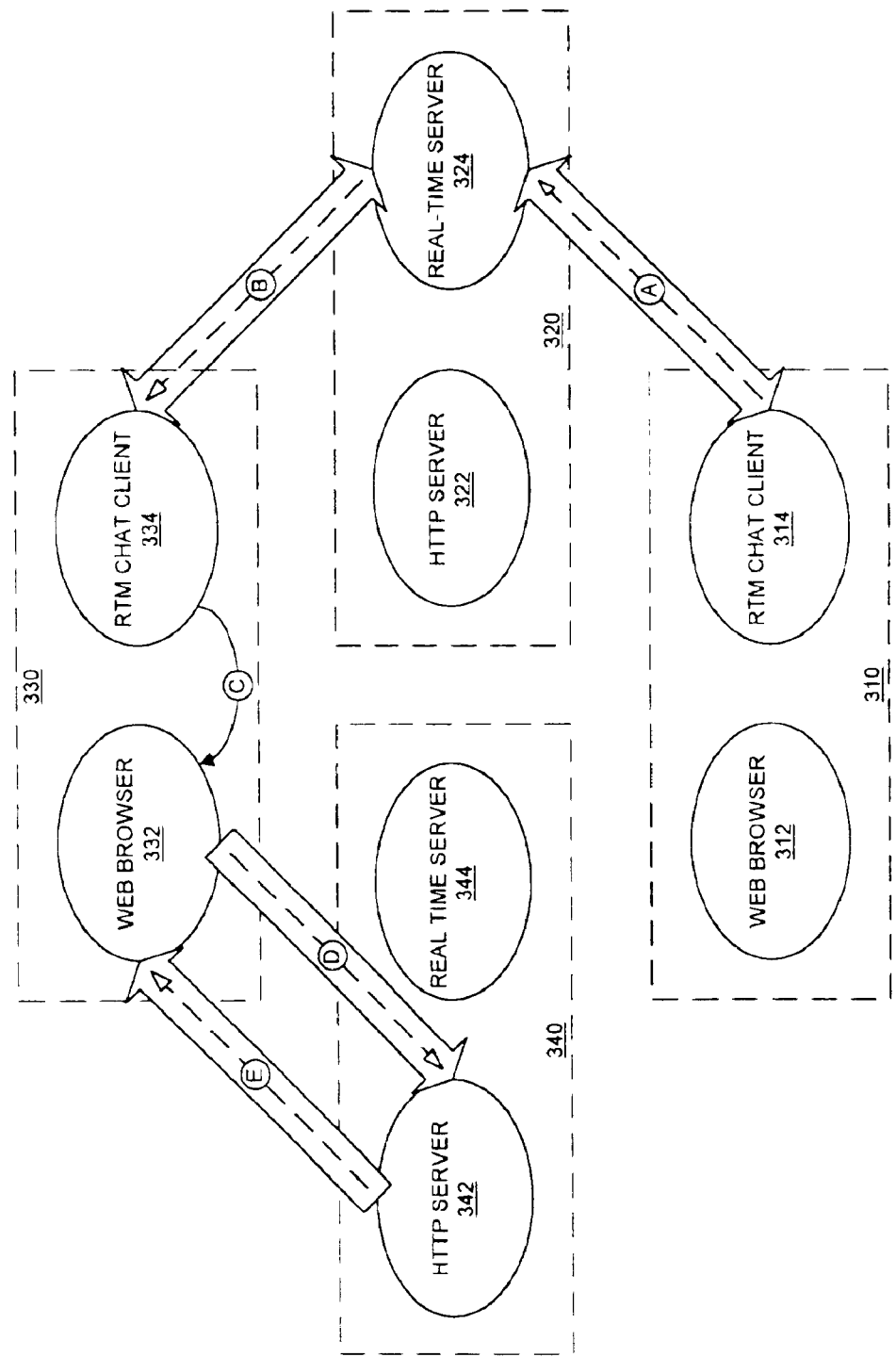
FIG. 3 is a schematic diagram of how a hyperlink functions during a real time network chat.

The manner in which hyperlinks function in a chat session among RTM chat clients is shown in more detail in FIG. 3. The two-way arrow between RTM chat client 314 in client 310 and a real time server 324 in host 320 represents a bi-directional TCP/IP-real time protocol communications channel. The two-way arrow between RTM chat client 334 in client 330 and the real time server 324 in host 320 also represents another bi-directional TCP/IP-real time protocol communications channel. The one way arrows between web browser 332 in the client 330 and HTTP server 342 in host 340 represent respective one way TCP/IP HTTP (transactional) protocol communications channels. The host 310 need not include a Web browser, the host 320 need not include an HTTP server 322, and the host 340 need not include a real time server 340.

RTM chat client 314 (e.g. Sarah) creates a message that includes an embedded hyperlink, and sends that message through the real time server 324 (action "A") to the RTM chat client 334 (e.g. Sam) (action "B"). Note that other actions that may be occurring, such as echo of the message back to the RTM chat client 314 and communication of the message to other joined chat clients, are omitted for clarity. The client 330 (e.g Sam) then causes his Web browser 332 to access the URL associated with the hyperlink embedded in the chat message (e.g. ichat site) (action "C"). Action "C" is performed in any suitable manner. For example, if the Web browser 332 is inactive, the RTM chat client 334 simply launches the Web browser 332 using the URL associated with the hyperlink as a command line argument. If the Web browser 332 happens to be running, the RTM chat client 334 communicates the page request to the Web browser 332 using any suitable interface protocol such as the DDE protocol, which is standard in such operating systems as the Microsoft® Windows® Version 3.1 operating system and the Microsoft® Windows® 95 operating system. Newer protocols and methods suitable for having the RTM chat client 334 cause the Web browser 332 to acquire a Web page include plug-in technologies, ActiveX technologies, and Java technologies. The Web browser 332 makes a TCP/EP connection with the HTTP server 342 (or any other HTTP server, including HTTP server 322) and Web browser 332 makes a request for a Web page (action "D") by sending the URL associated with the embedded hyperlink. The HTTP server 342 responds by delivering the requested Web page (action "E"), and the TCP/IP connection between the Web Browser 332 and the HTTP server 342 is terminated. Meanwhile, the bi-directional TCP/IP-real time protocol communications channels between the RTM chat client 314 and the real time server 324, and between the RTM chat client 334 and the real time server 324 remain open if desired to continue the chat session.

Although an illustrative embodiment and its advantages have been described in detail hereinabove, they have been described as example and not as limitation. Various changes, substitutions and alterations can be made in the illustrative embodiment without departing from the breadth, scope and spirit of the claims. For example, various real time communications protocols and various markup languages may be used.

What is claimed is:

1. A method for real-time network communication, comprising:

forming real-time communications protocol connections between chat clients and a chat server over network communications connections;

one of the chat clients embedding a markup language instruction in a chat-session message;

the one chat client sending the chat-session message on one of the real-time communications protocol connections to the chat server;

in response to receiving the sent chat-session message, the chat server sending the chat-session message on one of the real-time communications protocol connections to another of the chat clients; and in response to receiving the sent chat-session message, the other chat client marking up the received chat-session message according to the embedded instruction and displaying the marked-up chat-session message.

2. The method of claim 1 wherein the markup language instruction is a hyperlink instruction.

3. The method of claim 2 wherein the hyperlink instruction is associated with a document address, and the marking up comprises:

passing the document address to a document acquisition apparatus;

in response to the passing, obtaining the document from the document acquisition apparatus; and in response to the obtaining, the one chat client displaying the obtained document along with the first chat-session message.

4. The method of claim 2 wherein the hyperlink instruction is associated with a URL, and the marking up comprises:

passing the URL to a Web browsers;

in response to the passing, obtaining a web page corresponding to the URL; and in response to the obtaining, the web browser displaying the obtained web page.

5. The method of claim 1 wherein:
the forming comprises forming a real-time continuously-open bi-directional communications protocol connection between each of the chat clients and the chat server.

6. The method of claim 1 wherein:
the forming comprises forming a real-time chat communications protocol connection between each of the chat clients and the chat servers.

7. The method of claim 1 further comprising:
the other chat client embedding a hyperlink instruction in a second chat-session message; and
the other chat client sending the second chat-session message on the real-time communications protocol connections through the chat server to the one chat client.

8. The method of claim 1 wherein the markup language instruction is an html instruction.

9. The method of claim 8 wherein the html instruction is a bold tag.

10. The method of claim 8 wherein the html instruction is an italics tag.

11. A method for real-time network communication, wherein the network includes TCP/IP connections formed between a plurality of chat clients and a host, and respective real-time communications protocol connections formed between the chat clients and a chat server over the TCP/IP connections, the method comprising:
one of the chat clients receiving a chat-session message, originated by another of the chat clients and including a hyperlink language instruction included therein by the other chat client, from the host through at least one of the real-time communications protocol connections;
the receiving chat client parsing the chat-session message; and
the receiving chat client marking up the chat-session message in accordance with the hyperlink language instruction included therein and displaying the marked-up chat-session message.

12. The method of claim 11 wherein the hyperlink language instruction is associated with a document address, and the marking up comprises:
passing the document address to a document acquisition apparatus to obtain the document; and
in response to obtaining the document, displaying the obtained document along with the chat-session message.

13. The method of claim 11 wherein the real-time communications protocol connections between the chat clients and the chat server are real-time chat communications protocol connections.

14. The method of claim 11 wherein the real-time communications protocol connections between the chat clients and the chat server are real-time continuously-open bi-directional communications protocol connections.

15. A method for real-time network communication, comprising:
forming real-time communications protocol connections between chat clients and a chat server over network communications connections;
one of the chat clients receiving from the chat server a first chat-session message on one of the real-time communications protocol connections, the first chat-session message including a markup language instruction included therein by another of the chat clients;
the one chat client parsing the first chat-session message to identify the markup language instruction included therein; and
the one chat client marking up the first chat-session message in accordance with the markup language instruction included therein and displaying the marked-up first chat-session message.

16. The method of claim 15 wherein the markup language instruction is a hyperlink instruction.

17. The method of claim 16 wherein the hyperlink instruction is associated with a URL, and the marking up comprises:
passing the URL to a Web browser;
in response to the passing, obtaining a web page corresponding to the URL; and
in response to the obtaining, the web browser displaying the obtained web page.

18. The method of claim 15 wherein the markup language instruction is a bold tag.

19. The method of claim 15 wherein the markup language instruction is an italics tag.

20. The method of claim 15 wherein:
the forming comprises forming a real-time chat communications protocol connection between each of the chat clients and the chat servers.

21. The method of claim 15 wherein:
the forming comprises forming a real-time continuously-open bi-directional communications protocol connection between each of the chat clients and the chat server.

22. A chat communication client, comprising:
a computer for:
forming a real-time communications protocol connection between the chat client and a chat server over a network communications connection;
embedding a markup language instruction in a chat-session message; and
sending the chat-session message having the markup language instruction embedded therein on the real-time communications protocol connection through the chat server to another chat communication client to cause the other chat client to mark up the chat-session message according to the embedded instruction and to display the marked-up chat-session message.

23. The communication client of claim 22 wherein the markup language instruction is a hyperlink instruction.

24. The communication client of claim 22 wherein the real-time communications protocol connection is a real-time chat communications protocol connection.

25. The communication client of claim 22 wherein the real-time communications protocol connection is a real-time continuously-open bi-directional communications protocol connection.

26. A chat communication client, comprising:
a computer for:
forming a real-time communications protocol connection between the chat client and a chat server over a communications connection;
receiving from the chat server a chat-session message on the real-time communications protocol connection, the chat-session message including a markup language instruction included therein by another chat communication client;
parsing the chat-session message to identify the markup language instruction included therein;
marking up the chat-session message in accordance with the markup language instruction included therein; and
displaying the marked-up chat-session message.

27. The communication client of claim 26 wherein the markup language instruction is a hyperlink instruction.

28. The communication client of claim 26, wherein the chat-session message is a first chat-session message, wherein the markup language instruction is a first markup language instruction, and wherein the computer is further for:
   embedding a second markup language instruction in a second chat-session message; and
   sending the second chat-session message on the real-time communications protocol connection through the chat server to the other chat client.

29. The communication client of claim 26 wherein the markup language instruction is associated with a document address, and wherein the computer is further for:
   passing the document address to a document acquisition apparatus;
   obtaining the document from the document acquisition apparatus; and
   displaying the obtained document alone with the chat-session message.

30. The communication client of claim 26 wherein the real-time communications protocol connection is a real-time chat communications protocol connection.

31. The communication client of claim 26 wherein the real-time communications protocol connection is a real-time continuously-open bi-directional communications protocol connection.

32. A chat communication server, comprising:
   a computer for:
      forming real-time communications protocol connections between chat clients and the chat server over network communications connections;
      receiving from one of the chat clients a chat-session message on one of the real-time communications protocol connections, wherein the chat-session message includes a markup language instruction included therein by the one chat client, to cause another chat client that receives the chat-session message to mark up the chat-session message according to the embedded instruction and to display the marked-up chat-session message; and
      sending the received message including the markup language instruction to the other of the chat clients on another of the real-time communications protocol connections to cause the other chat client to mark up the chat-session message according to the embedded instruction and to display the marked-up chat-session message.

33. The communication server of claim 32 wherein the markup language instruction is a hyperlink instruction.

34. The communication server of claim 32, wherein the chat-session message is a first chat-session message, wherein the markup language instruction is a first markup language instruction, and wherein the computer is further for:
   receiving a second chat-session message on the other real-time communications protocol connection from the other chat client, wherein the second chat-session message includes a second markup language instruction included therein by the other chat client; and
   sending the received second chat session message including the second markup language instruction to the one chat client on the one real-time communications protocol connection.

35. The communication server of claim 32 wherein the markup language instruction is a hyperlink instruction.

36. The communication server of claim 32 wherein the real-time communications protocol connection is a real-time chat communications protocol connection.

37. The communication server of claim 32 wherein the real-time communications protocol connection is a real-time continuously-open bi-directional communications protocol connection.

38. A computer program product, comprising:
   a computer application processable by a computer for causing the computer to:
   form a real-time communications protocol connection between a first chat client and a chat server over a network communications connection;
   receive from the chat server a first chat-session message on the real-time communications protocol connection, the first chat-session message including a markup language instruction included therein by another chat client;
   parse the first chat-session message to identify the markup language instruction included therein;
   mark up the first chat-session message in accordance with the markup language instruction included therein; and
   display the marked-up first chat-session message.

39. The computer program product of claim 38 wherein the markup language instruction is a hyperlink instruction.

40. The computer program product of claim 38 wherein the computer application is processable by the computer for causing the computer to:
   embed a markup language instruction in a second chat-session message; and
   send the second chat-session message on the real-time communications protocol connection to the other chat client through the chat server.

41. The computer program product of claim 38 wherein the markup language instruction is associated with a document address, and wherein the computer application is processable by the computer for further causing the computer to:
   pass the document address to a document acquisition apparatus;
   obtain the document from the document acquisition apparatus; and
   display the obtained document alone with the first chat-session message.

42. The computer program product of claim 38 wherein the real-time communications protocol connection is a real-time chat communications protocol connection.

43. The computer program product of claim 38 wherein the real-time communications protocol connection is a real-time continuously-open bi-directional communications protocol connection.

44. A computer program product, comprising:
   a computer application processable by a computer for causing the computer to:
   form a real-time communications protocol connection between a first chat client and a chat server over a network communications connection;
   embed a markup language instruction in a chat-session message; and send the chat-session message including the markup language instruction on the real-time communications protocol connection to another chat client through the chat server to cause the other chat client to mark up the chat-session message according to the embedded instruction and to display the marked-up chat-session message.

45. The computer program product of claim 44 wherein the markup language instruction is an html instruction.

46. The computer program product of claim 45 wherein the html instruction is a hyperlink instruction.

47. The computer program product of claim 46 wherein the hyperlink instruction is associated with a URL of information to be displayed by the other chat client along with the chat-session message.

48. The computer program product of claim 45 wherein the html instruction is a bold tag.

49. The computer program product of claim 45 wherein the html instruction is an italics tag.

50. The computer program product of claim 44 wherein the real-time communications protocol connection is a real-time chat communication protocol connection.

51. The computer program product of claim 44 wherein the real-time communications protocol connection is a real-time continuously-open bi-directional communications protocol connection.

* * * * *

UNITED STATES PATENT AND TRADEMARK OFFICE
CERTIFICATE OF CORRECTION

PATENT NO. : 6,862,625 B1
APPLICATION NO. : 09/060867
DATED : March 1, 2005
INVENTOR(S) : Andrew T. Busey and Gerald H. Weghorst, Jr.

Page 1 of 1

It is certified that error appears in the above-identified patent and that said Letters Patent is hereby corrected as shown below:

Title Page, Related U.S. Application Data located at (63), "Continuation" should read
-- Continuation-in-part --.

In the Specifications:
Column 1, line 6, "continuation" should read -- continuation-in-part --.

Signed and Sealed this
Fourteenth Day of May, 2013

Teresa Stanek Rea
*Acting Director of the United States Patent and Trademark Office*